July 28, 1959 — O. E. SAARI — 2,896,467
SKEW-AXIS GEARING WITH PLANE TOOTH GEAR
Filed Oct. 1, 1957 — 4 Sheets-Sheet 1

INVENTOR.
Oliver E. Saari
BY Olson & Trexler
attys

INVENTOR.
Oliver E. Saari

Inventor
Oliver E. Saari
By: Olson & Trexler
attys

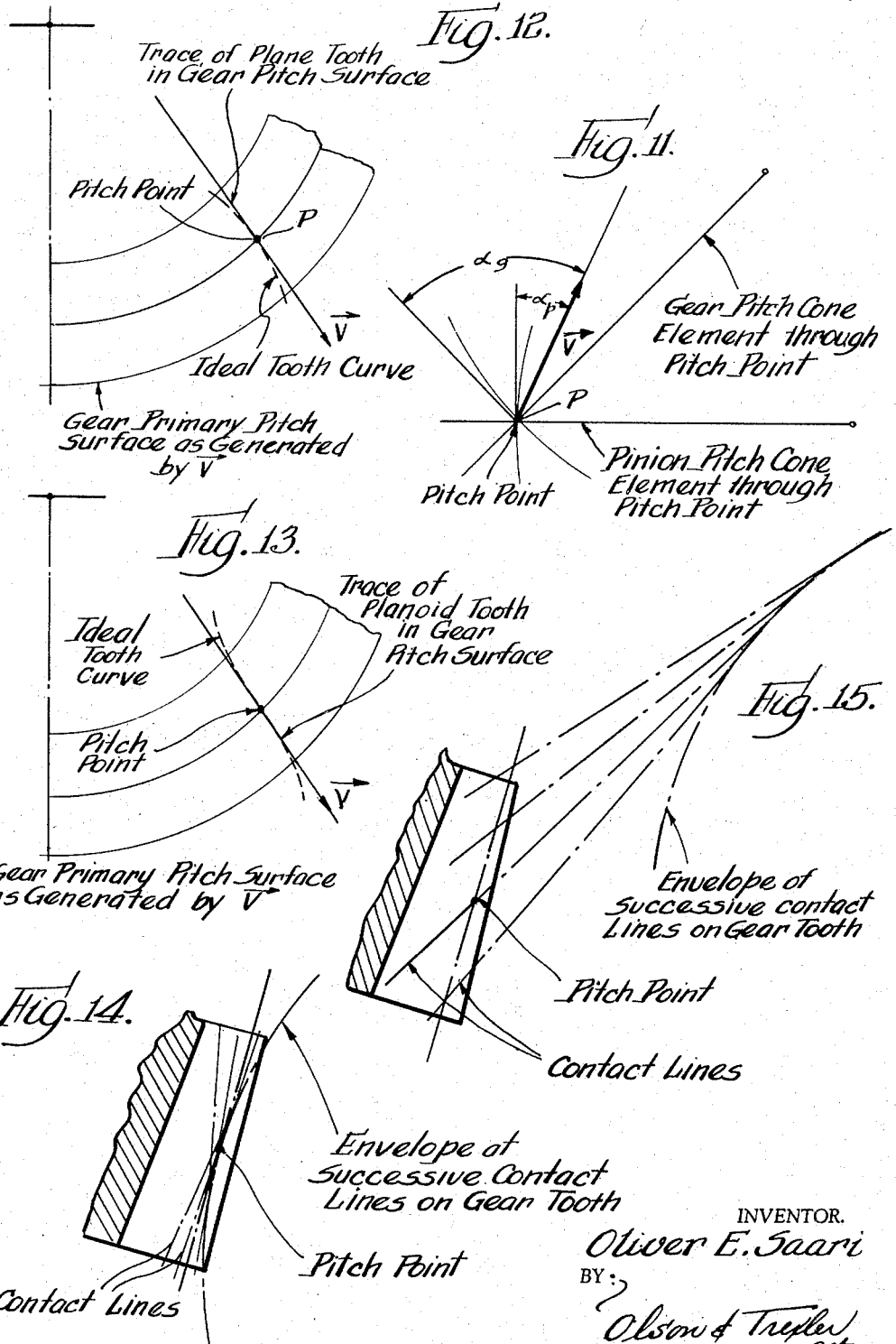

United States Patent Office 2,896,467
Patented July 28, 1959

2,896,467

SKEW-AXIS GEARING WITH PLANE TOOTH GEAR

Oliver E. Saari, Schiller Park, Ill., assignor to Illinois Tool Works, Chicago, Ill., a corporation of Illinois Application October 1, 1957, Serial No. 687,504

18 Claims. (Cl. 74—459.5)

This invention relates generally to speed reduction gearing, and more particularly to skew-axis gearing, that is gearing in which the axes of the mating gears are neither parallel nor intersecting.

Skew-axis gears or gearing often are used when a drive shaft and a driven shaft must be offset from one another by a predetermined amount. In many prior skew-axis gears, the predetermined offset has been limited relative to the gears to an unduly great extent, and calculation of the necessary dimensions of such gears to fit a predetermined amount of offset for a given gear size has often been difficult or impossible. Furthermore, such reduction gearing has been limited as to how low the reduction ratio can go.

Accordingly, it is an object of this invention to provide skew-axis gearing which has an unusually large offset for the size of the gears.

It is a further object of this invention to provide skew-axis gearing which has a greater area of contact at a better selection of pressure angles, resulting in stronger and quieter gearing.

A further object of this invention is to provide skew-axis gearing having extremely low reduction ratios.

Other objects are to provide a skew-axis gearing which is simpler and more economical to design, produce and inspect, which requires less investment in machine tools and checking facilities, and which has a better control of accuracy and uniformity.

My prior Patent 2,776,578 discloses an improved form of skew-axis gearing. As is set forth in that patent, there is a "relative velocity vector" which indicates the direction of the relative movement of two cognate surfaces of revolution at a point at the line of contact. A spiral curve drawn on the outer surface of the smaller or driving member, hereinafter termed the worm or pinion, intersects the line of contact between the worm and its cognate surface at successive points of the line of contact as the surfaces rotate. There is only one such spiral which is tangent to the relative velocity vector at each point at which it intersects the line of contact. This spiral curve, as set forth in my aforesaid patent, has been called the "relative velocity vector spiral." In my aforesaid Patent 2,776,578, and further in accordance with my prior Patent 2,696,125, the worm is considered to be the primary member, and the relative velocity vector spiral is substantially duplicated or approximated on the worm. A hob similar to the worm is used for generating the gear.

In accordance with the present invention, the gear is considered to be the primary member, rather than the worm. The gear has a tooth form corresponding to the relative velocity vector spiral, and this tooth form can be expressed mathematically. Under certain conditions, an approximation can be made to the gear tooth curve which very closely approximates the ideal curve corresponding to the relative velocity vector spiral, producing a gear tooth of simple and effective form. A hob similar in form to the gear is then used to cut the worm or pinion.

More specifically, there is a combination of offset, reduction ratio, and worm or pinion diameter wherein the aforesaid ideal tooth curve on the gear is an S-shaped curve. At the point of inflection or reversal, it is a curve of infinite radius. In other words, it is straight. Thus, the ideal tooth curve on the gear can be closely approximated by a straight gear tooth. Such gear teeth are simple to fabricate.

The foregoing will be more fully understood, as will be the objects enumerated and other objects and advantages, with reference to the following description when taken in connection with the accompanying drawings wherein:

Fig. 11 illustrates the definition of spiral angles in the pitch plane;

Fig. 12 is a fragmentary, schematic plan view of a gear with the pitch point taken at an undesirable position;

Fig. 13 is a similar view with the pitch point taken at a desirable location;

Fig. 14 is an enlarged view of the face of a gear tooth showing contact lines thereon at the limit pressure angle; and Fig. 15 is a similar view showing desirable contact lines on the gear tooth.

Figure 1:
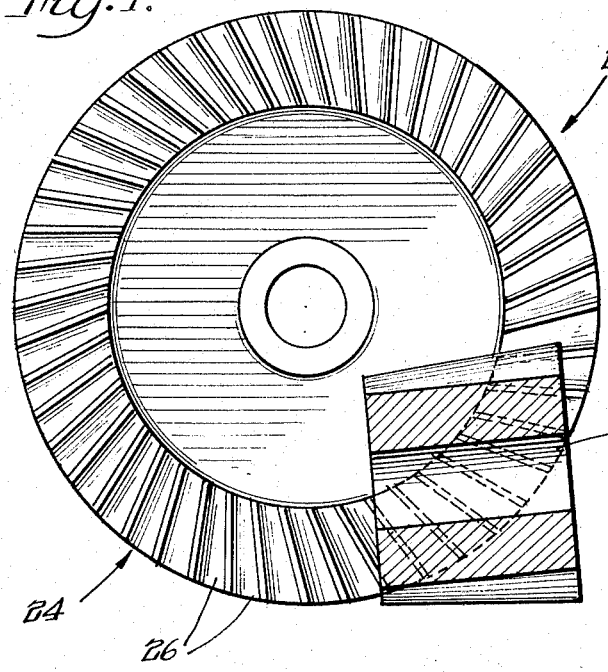
Fig. 1 is a plan view of a face type skew-axis gearing in accordance with this invention wherein the gear teeth are nonradial, and the gear is a flat gear.
Figure 2:
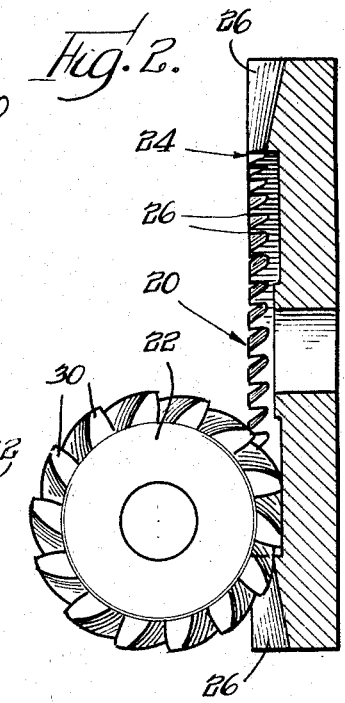
Fig. 2 is a side view of the gearing shown in Fig. 1, the gear being shown in cross section.
Figure 3:
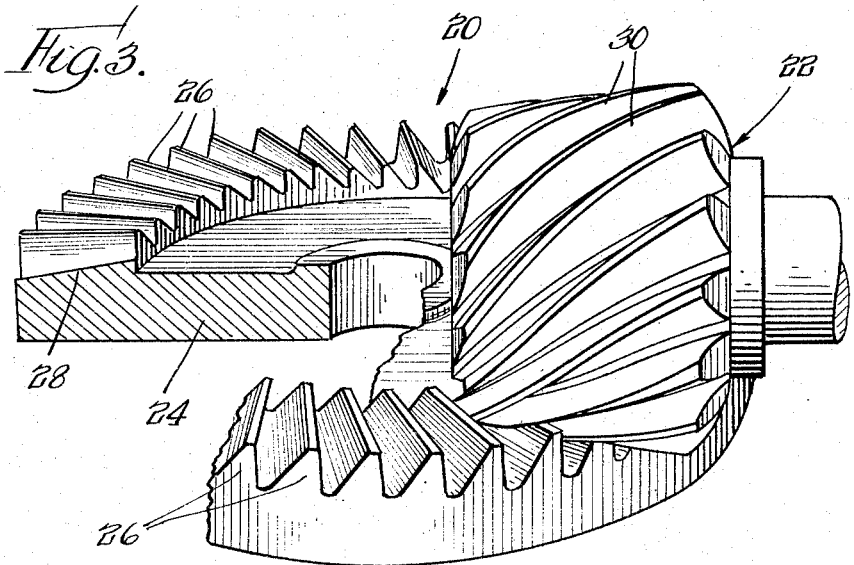
Fig. 3 is a perspective view of the gearing shown in Figs. 1 and 2, part of the gear being broken away.

Referring now in greater particularity to the drawings, and first to Figs. 1–3, there will be seen a skew-axis gearing designated generally by the numeral 20. The gearing includes a worm or pinion 22 and a relatively large face type gear 24 meshing with the pinion. The axes of the gear and pinion, in this particular case, are at right angles to one another. The gear teeth 26 are disposed nonradially of the gear, and the teeth are straight. The upper ends or top lands of the teeth 26 lie in a plane, and the gear hence may be called a flat gear. The bottom ends or bottom lands lie on the surface of a cone as may be seen at 28. The threads or teeth 30 of the pinion are curved in order properly to cooperate with the straight teeth 26 of the gear.

Figure 4:
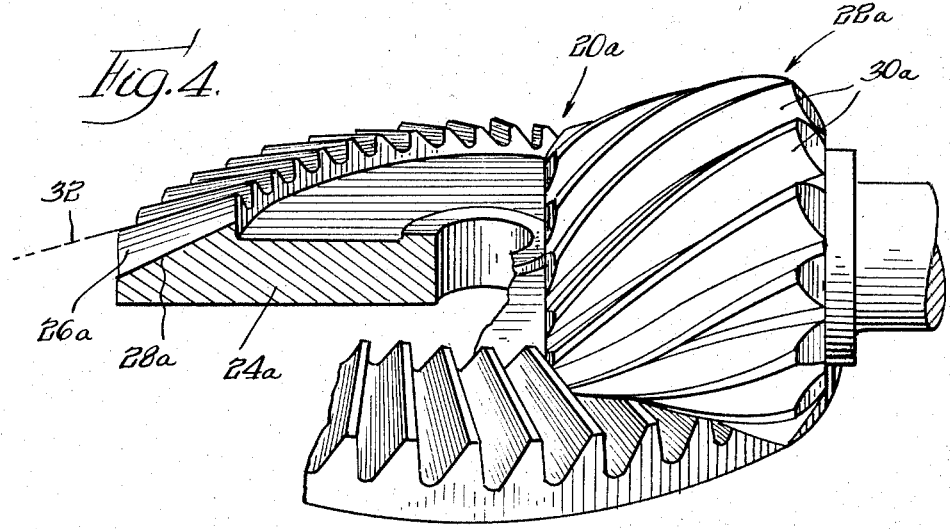
Fig. 4 is a view similar to Fig. 3, but showing a conical gear.

A similar but general form of gearing or gear set 20a is shown in Fig. 4. The parts in general are similar, and similar numerals are utilized to identify such parts, the suffix "a" being added to the numerals. The distinguishing feature is that the upper ends or outer or top lands of the teeth lie on the surface of a cone, as is indicated at 32. The flat gear of Figs. 1–3 is a special case. The inner or bottom land conical surface is somewhat steeper than in the previous embodiment. The teeth 26a are straight, and are nonradial, as in the gearing previously described.

Figure 5:
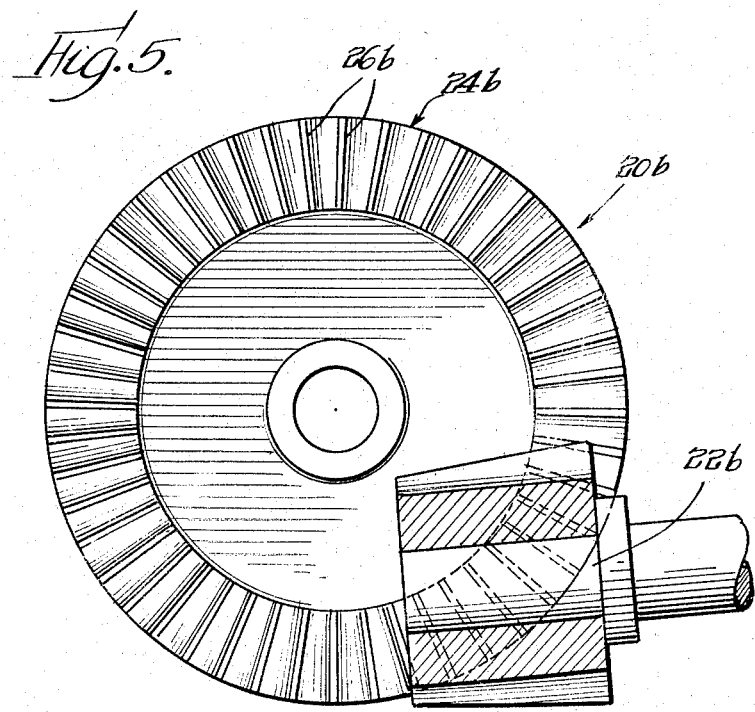
Fig. 5 is a view similar to Fig. 1, but showing radial teeth on the gear.

A special case of the invention is illustrated in Fig. 5. In this instance, the teeth 26b are radial teeth. The teeth are straight as previously disclosed, and the mating teeth or threads of the pinion 22b are curved, as in the general cases illustrated in Figs. 1–3 and in Fig. 4. The gear 20b may be either a flat gear of the type shown in Figs. 1–3, or it may be a conical gear as shown in Fig. 4.

Perhaps, in fuller explanation of the tooth shape, it should be stated that the teeth are plane. In other words, the profile is provided by planes on both the drive and coast sides.

Figure 7:
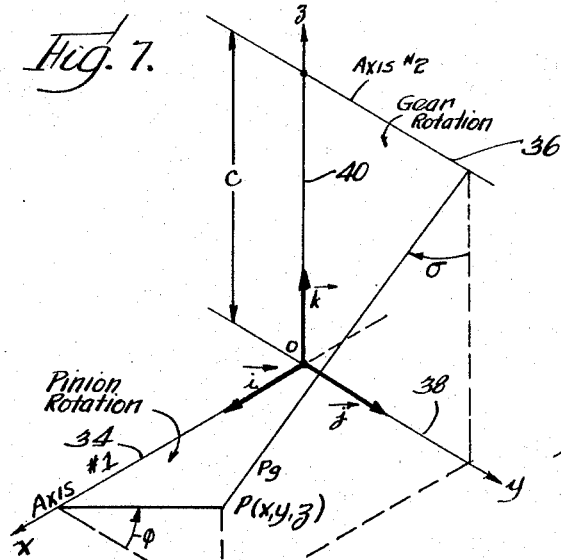
Fig. 7 shows a coordinate system for lefthanded right angle skew-axis gears.

Before referring specifically to the formulae by which the gearing herein described is determined, it is thought that it would be helpful to note certain generalities with regard to skew-axis gearing. For the sake of simplicity and consistency, consideration will be given to equations and formulae limited to a left-handed skew-axis gearing wherein the axes of the gears are at right angles. Such a coordinate sysem is shown in Fig. 7. The axis of the pinion 22 lies along the $x$ axis as indicated at 34. The axis of the gear 24 coincides with a line parallel to the $y$ axis and passing through the $z$ axis at a distance C above the $xy$ plane. The axis of gear rotation is indicated by the line 36. The $y$ and $z$ axes are conventionally identified, and also are respectively identified by the numerals 38 and 40. The directions of pinion and gear rotation are indicated in Fig. 7, and correspond to a lefthand system. It will be understood that the directions of both rotations could be changed simultaneously without affecting the handedness, since the field lines of relative velocity would not be changed. If only one of the rotations is changed, the system becomes righthanded. However, the same equations applied to the lefthanded system can be made applicable to a righthanded system if a new set of coordinates is used in which the direction of the positive $y$ axis is reversed.

The location of a general point P can be fully described by giving values to its $x$—$y$—$z$ coordinates, or by giving any three of the cylindrical coordinates $R_p$, $R_g$, $\phi$, $\sigma$. Appropriate transformations exist between the various coordinates, and useful identities exist, all as will be apparent to those skilled in mathematics and in gear design.

Associated with the rectangular coordinate system are the conventional unit vectors $\vec{i}$, $\vec{j}$, $\vec{k}$. The gears have a constant angular velocity ratio K, which is the ratio of numbers of teeth (gear teeth/pinion teeth). The angular velocities can be represented vectorially and convenient magnitudes can be chosen, provided the given ratio is maintained. Thus, if $-K\vec{i}$ is the angular velocity of the pinion, and $\vec{j}$ is the angular velocity of the gear, it is seen that both the angular velocity ratio K and the proper senses of rotation are maintained. The relative velocity $\vec{V}$ (as derived on pages 134 and 135 of "The Mathematical Background of Spiroid Gears" by O. Saari, Industrial Mathematics, volume 7, 1956, Wayne State University Press, Michigan) is then a vector point function $$\vec{V} = V_x\vec{i} + V_y\vec{j} + V_z\vec{k} \qquad (1)$$

In the above expression, $V_x = C-z$; $V_y = Kz$; and $V_z = x - Ky$.

$V_x$, $V_y$, and $V_z$ are scalar point functions which are equivalent to direction numbers of the relative velocity vector at every point of the coordinate space. These three quantities retain their proportionality regardless of the absolute velocity of the gears, depending only on the point coordinates and the ratio K. Thus, for a given axis configuration and angular velocity ratio, a direction of relative velocity is uniquely determined at every point of the coordinate space.

Figure 8:
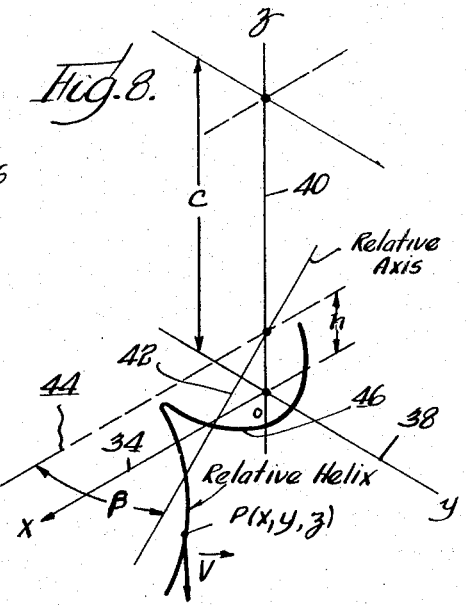
Fig. 8 is a diagram illustrating the relative velocity vector, relative axis, and relative helix through a general point.

The field lines (as defined on page 135 of the Industrial Mathematics reference above) of the relative velocity vector field are helices of constant lead about a fixed axis called the relative axis. The relative axis is appropriately labeled, and further is identified by the numeral 42 in Fig. 8, and is a line parallel to the $x$—$y$ plane, which passes through the $z$ axis at a height $h$ above the $x$—$y$ plane, and makes an angle B with the projected $x$ axis indicated at 44. The relative helix is identified at 46 in Fig. 8. Various mathematical relations can be developed by known mathematical methods. In a lefthanded system, the relative helices are left-handed. In a right-handed gear system, they are right-handed.

The general law of gear tooth conjugate action is as follows: At every conjugate point, the tooth surface normal must be perpendicular to the direction of relative velocity. This law is useful in designing skew-axis gear teeth and analyzing their contact. From this, it can be shown that the contact lines of all plane gear teeth are straight lines. Favorable distribution of contact lines is always an important goal in the design of gear teeth. Furthermore, if a tooth surface is positioned so that at some point on it the surface normal is perpendicular to the relative velocity at that point, that point will have a possible conjugate action. Such a point represents a logical starting place for the design of the gearing disclosed in this application. Such point is relied on as the pitch point.

Figure 9:
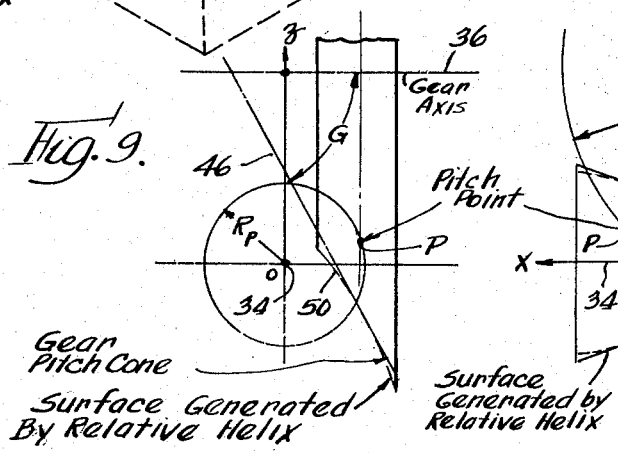
Fig. 9 is a schematic side view of the gear showing the relationship of pitch cones and surfaces generated by the "relative helix" at any given pitch point.
Figure 10:
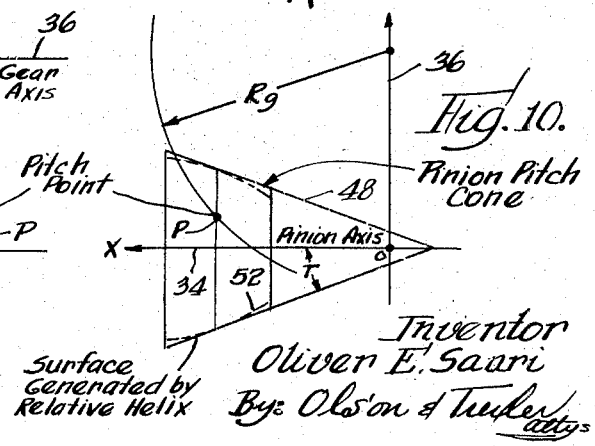
Fig. 10 is a side view of the worm or pinion illustrating the same relationship.

Proceeding further, let $P(x, y, z)$ be an arbitrary pitch point. Consider the relative velocity vector $\vec{V}$, at this point as defined by Equation 1. For any speed ratio K and axis position C this vector has a definite direction in space. If K alone is changed, the direction of relative velocity is changed. However, at any fixed point the effect of changing K is merely to rotate the relative velocity vector in a fixed plane. This plane is unique at every point and does not depend on K. This plane will hereinafter be called the pitch plane. It is the common tangent plane of the two unique cones, coaxial with the gear and pinion axes, which are tangent to one another at the pitch point under consideration. The normal to the pitch plane is called the pitch normal. The two cones generated about the gear and pinion axes by the pitch plane are called the pitch cones. The relative helix through the pitch point generates tangent surfaces of revolution which are tangent to the respective pitch cones. The foregoing concepts are illustrated in Figs. 9 and 10, wherein the pinion-pitch-circle diameter is represented by $R_p$, and the gear-pitch-circle diameter, by $R_g$. The pitch angle of the gear-pitch cone is indicated at G, the gear-pitch cone itself being identified by the numeral 46. The pinion-pitch cone is identified by the numeral 48, and the pitch angle thereof is indicated at T. The gear surface generated by the relative helix is identified by the numeral 50, and the corresponding pinion surface generated by the relative helix is identified by the numeral 52.

Certain other facts are of interest. The pitch normal is independent of the speed ratio K, as can be demonstrated mathematically. The pitch normal always intersects the axes of both gears, or is parallel to one of them. The pitch-cone angles are the complements of the angles between the pitch normal and the gear axes. The pitch-cone angles are single-valued point functions throughout the coordinate space.

The relative velocity vector at any point always lies in the pitch plane at that point. Thus, the directions of relative velocity can be given in terms of spiral angles $\alpha_p$ and $\alpha_g$ which are defined in the developed views of the pitch cones, as shown in Fig. 11. The pitch cones are tangent to one another at the pitch point. At this pitch point they have a common tangent plane. A cone is a developable surface. Hence, each cone can be developed (or rolled) into the common tangent plane without disturbing the angular or length dimensions associated with curves drawn on the cones. This is the developed view of the pitch cones in Fig. 11. Functions of the spiral angles can be expressed in rectangular coordinates by known mathematical methods. A convenient general relationship between the gear and pinion spiral angles is $$\sin \alpha_g = \left(\frac{KR_p}{R_g}\right) \sin \alpha_p \quad (2)$$

To obtain the full potential advantage of face-type skew-axis gearing, contact lines must sweep across virtually the entire faces of the pinion and gear teeth. This is accomplished in accordance with the present invention, as will be set forth hereinafter. Two of the basic elements describing a tooth surface at the pitch point are the spiral angle of its trace in the pitch cone, and the pressure angle, which is the angle between the tooth surface normal and the pitch plane. The proper spiral angle assures possible conjugate contact at the pitch point, and limits the tooth surface tangent plane to one degree of freedom, described by the arbitrary pressure angle. The pressure angle affects the rate at which the contact line sweeps across the tooth face, and also the inclination of the contact lines to the pitch plane. For a certain value of pressure angle, the rate of contact line traverse is zero. This condition serves to define the limit pressure angle and the limit normal. The limit normal is a tooth surface normal which satisfies a conjugate equation identically before and after an infinitesimal rotation. Stated otherwise, the contact point is instantaneously stationary on a gear tooth face having limit pressure angle. The limit normal line can be described by a limit normal vector $\vec{N}_L$ codirectional with it. The limit normal vector is given as a vector point as follows:

$$\vec{N}_L = x\vec{i} + y\vec{j} + \left(z + \frac{Cx}{Ky - x}\right)\vec{k} \quad (3)$$

Thus at every point of the coordinate space, there is a unique direction of limit normal.

The limit pressure angle can be comprehended in another manner by analogy to conventional spur gears. A pair of mating teeth of conventional spur gears engage along a line of contact (parallel to the gear axes in the case of simple gears) which moves more or less radially along the teeth as the gears rotate. It is possible to design the pressure angles of the gear teeth so that the contact line will be stationary, rather than moving. In the gearing herein disclosed there are contact lines which also are intended to sweep along the surfaces of the gear teeth. As the pressure angle is varied, an angle will be reached at which the lines are stationary rather than sweeping. This is the limit pressure angle. As will be understood by further analogy to spur gears, a stationary line of contact for each pair of mating teeth is undesirable.

It can be demonstrated that the contact line is always parallel to the projection of the relative axis onto the tooth surface. Also, since the pinion tooth surface is the envelope of a one-parameter family of plane surfaces, it is a developable surface.

Reference heretofore has been made in this specification to the ideal tooth curve. To describe this curve, a primary pitch surface must first be chosen. This is an arbitrary surface of revolution whose axis coincides with either the gear or the pinion axis. Once this primary pitch surface has been chosen, the conjugate pitch surface is uniquely determined and is the surface of revolution coaxial with the other gear member which is generated by the primary surface. The two mating pitch surfaces contact one another along a definite line (which may be straight or curved) called the pitch contact locus. A curve embedded in either of the pitch surfaces crosses the pitch contact locus in a moving point as the surface rotates. The ideal tooth curve is the unique curve which is codirectional with the relative velocity at every point of the pitch contact locus. Thus, each of the primary and conjugate pitch surfaces has an ideal tooth curve associated with it. These curves have continuous tangential contact at the pitch contact locus as the pitch surfaces turn at the given angular velocity ratio. Gear teeth which have traces in the pitch surfaces coinciding with the ideal tooth curves have conjugate contact at every point of the pitch contact locus.

It accordance with my aforesaid patents, the ideal tooth curve is applied to or approximated on the pinion. In accordance with the present invention, the ideal tooth curve is approximated on the gear. More particularly, simple plane tooth surfaces are put on the gear. Hence, convenient primary pitch surfaces coaxial with the gear axis must be chosen. If a straight line, codirectional with the relative velocity vector, is held stationary at any pitch point, and a blank is rotated about the gear axis, a surface of revolution is generated by the straight line on this blank. For the general pitch point, the primary pitch surface so generated is a hyperboloid of revolution. The traces of the gear teeth in this hyperboloid are straight lines since the plane gear teeth must contain the relative-velocity vector at the pitch point, and this vector itself is the generatrix of the hyperboloid. This primary-pitch surface is thus defined by the choice of the pitch point; and the ideal tooth curve, as well as the conjugate pitch surface of the pinion, is also defined. The conjugate pinion pitch surface is a hyperboloid only in special cases which have no significance here. In general, the ideal tooth curve on the primary gear will be codirectional with the generatrix of the hyperboloid at the pitch point, regardless of the location of that point, since the generatrix is simply the relative-velocity vector which is codirectional with the ideal tooth curve by definition. However, the ideal tooth curve may come out to have a finite radius of curvature which would not match the infinite-curvature radius of the gear-tooth form. This would mean that the straight-gear teeth deviate farther along their length from the ideal tooth gear than would be the case if the curvatures, as well as the direction, were matched at the pitch point. This undesirable condition is illustrated in Fig. 12.

Defined in the foregoing manner, the pitch surfaces, the ideal tooth curves, and their radii of curvature become definite functions of the pitch-point coordinates. Thus, by varying these pitch-point coordinates, it is possible to vary the radius of curvature of the ideal tooth curve. For some sets of pitch-point coordinates, the radius of curvature at the pitch point becomes infinite, thereby matching the straight-line-tooth form as closely as possible. In other words, the tooth is tangent to the ideal tooth curve at the pitch point, and the pitch point lies on a point of inflection of the curve.

In accordance with the principles of this invention, the pitch point coordinates are made to satisfy the following relationship, called the pitch point equation:

$$(Ky - x)^3 + [CX + z(Ky - x)][z(1 + K^2) - C] = 0 \quad (4)$$

Equation 4 limits the choice of pitch point to two independent variables (any two of the cordinates $x$, $y$, $z$) and defines what might be called "ideal pitch points," or points which insure certain desirable qualities in the gear tooth action. The equation represents a definite surface in the coordinate space for any combination of center distance C and speed ratio K. The equation amounts to a mathematical statement that, at ideal pitch points, the plane determined by the relative velocity vector and the limit normal is parallel to the relative axis.

The relationship of the tooth to the ideal tooth curve at a desirable pitch point is illustrated in Fig. 13.

The hyperboloidal gear-pitch surface and the corresponding pinion-pitch surrface are tangent to the pitch cones along circles passing through the pitch point. They have a common tangent plane and common normal at the pitch point which are identical with those of the pitch cones. Therefore, the same conventions regarding definitions of spiral angle and pressure angles can be used.

The limit pressure angle $\phi_L$ at any pitch point is zero only if the limit normal lies in the pitch plane. In general, for most designs, the limit pressure angle is not zero. However, it is desirable to keep the limit pressure angle as small as possible, as will be understood from the following:

It can readily be shown that, for a plane tooth surface at limit pressure angle, the contact line is codirectional with the relative-velocity vector at the pitch point. Moreover, for such a tooth surface, the pitch point is on the enveloping curve of the total family of contact lines so that these lines do not then sweep rapidly across the face of the gear tooth, and it is difficult to get contact over the full faces of the teeth. This condition is illustrated in Fig. 14, and is not desirable. Proper, useful contact with sweeping of the contact lines across a tooth surface is illustrated in Fig. 15.

The limit pressure angle and sweeping of the contact lines readily can be comprehended by analogy to involute spur gears. As is well known, in such gears there is a line contact that sweeps across contacting gear tooth surfaces in a direction radially of the gears. If the pressure angle of the tooth face is reduced to a critical value, the limit pressure angle, the contact line is stationary. Only fixed-line contact is attained, and only a small amount of power can be transmitted.

Similarly, in the gearing herein disclosed, the contact lines should sweep across the gear tooth faces. If the tooth faces were at the limit pressure angle, there would be no such sweeping. There would be only fixed-line contact, the tooth surfaces would have large inactive areas, and the gearing would not be able to transmit very much power. For symmetrical, useful contact, as illustrated in Fig. 15, it is best if the actual pressure angles used differ from the limit pressure angle by substantially equal, rather large amounts, preferably as much as twenty degrees, and not less than 10° if efficient contact is to be obtained. In most practical cases, the resulting pressure angles of the gear tooth faces are unsymmetrical (although symmetrical about the limit pressure angle). This results in strong buttressed teeth.

Large angles are to be avoided, because of increased tooth pressures and separating forces, and negative angles are to be avoided because they complicate manufacture and weaken the tooth structure. Thus, the choice of pitch point must be made with the additional object of keeping the limit pressure angle below some nominal figure, such as fifteen or twenty degrees. The limit pressure angle may be computed from the coordinates of the pitch point from the following equation:

$$\tan \phi_L = \frac{1}{C}(R_p \cot \sigma \cos \alpha_p - R_g \tan \phi \cos \alpha_g) \quad (5)$$

An additional limitation in the choice of pitch point may arise from a desired configuration of the gearing. A particular center distance, gear outside diameter, and gear face width may be required for a given application. The pitch point should preferably be located somewhere near the mean diameter of the gear, so that the gear pitch radius $R_g$ must be held fixed. This places the additional limitation to the pitch point coordinates, $$R_g^2 = x^2 + (C-z)^2 \quad (6)$$

This additional requirement places the pitch points on the space curve determined by Equations 4 and 6 simultaneously, thus limiting its choice to one independent variable. A point must be found along this curve at which the limit pressure angle is equal to or less than the desired maximum value.

The foregoing, and particularly Equation 4, expresses the conditions for producing gearing in accordance with the principles of this invention, and is for the general case. There are certain special cases which in some instances are useful, and these are set forth hereinafter.

FLAT GEARS

One special form of the gearing as heretofore described is that in which the pitch point lies in the $xy$ plane, i.e., $z=0$. In this case, the gear pitch cone is a transverse plane (plane of rotation) and the pinion pitch cone is a cylinder. All of the relative velocity vectors to be considered are perpendicular to the gear axis, and the gear pitch surfaces generated by them are transverse planes, identical with the gear pitch cones. The pitch point equation, Equation 4 becomes:

$$(Ky-x)^3 - C^2 x = 0 \quad (7)$$

The limit pressure angle formula, Equation 5, becomes:

$$\tan \phi_L = \frac{y}{x} \cos \alpha_p \quad (8)$$

The following useful identity also can be shown to be true for the special case of the flat gear:

$$\cot \phi_L = K \cos \alpha_p \quad (9)$$

RADIAL GEAR TEETH

Another useful simplification of the formulae comes from considering only those points whose relative velocity vectors pass through the gear axis. This design has several advantages in computation, design, manufacture, and inspection. In this case, the pitch point Equation 4 becomes:

$$cx^4 + [z(C-z)^2]x^2 - \frac{(C-z)^6}{C-z(1+K^2)} = 0 \quad (10)$$

This equation can be put in dimensionless form by introducing an arbitrary independent variable $u$ such that:

$$z = \frac{Cu}{1+K^2} \quad (11)$$

The dimensionless form of the pitch point equation for radial gear teeth then becomes:

$$\tan^4 \sigma + \left(\frac{u}{1+K^2}\right) \tan^2 \sigma - \frac{\left(1-\frac{u}{1+K^2}\right)}{1-u} = 0 \quad (12)$$

$$x = (C-z) \tan \sigma$$
$$R_g = (C-z) \sec \sigma$$
$$y = \frac{R_g^2}{Kx}$$
$$R_p = \sqrt{y^2 + z^2}$$
$$\tan T = \frac{z \tan \sigma}{R_p}$$
$$\tan G = \frac{y \cos \sigma}{z}$$
$$\tan \phi_L = \frac{z \cos \sigma}{C \sin T} \quad (13)$$

FLAT-RADIAL GEAR

This is a special case combining the aspects of the last two special cases. All of the pitch points are in the $x-y$ plane, and the relative velocity vectors (and therefore the traces of the gear teeth) are radial. The formulae then become as follows:

$$z = 0$$
$$\tan \sigma = 1 \quad \sigma = 45°$$
$$x = C$$
$$R_g = C\sqrt{2}$$
$$y = \frac{2x}{K}$$
$$\tan T = 0 \quad T = 0°$$
$$\tan G = \infty \quad G = 90°$$
$$R_p = y \quad (14)$$

The limit pressure angle is expressed as follows:

$$\tan \phi_L = \frac{y \cos \sigma}{x} \qquad (15)$$

Fig. 6

Figure 6:
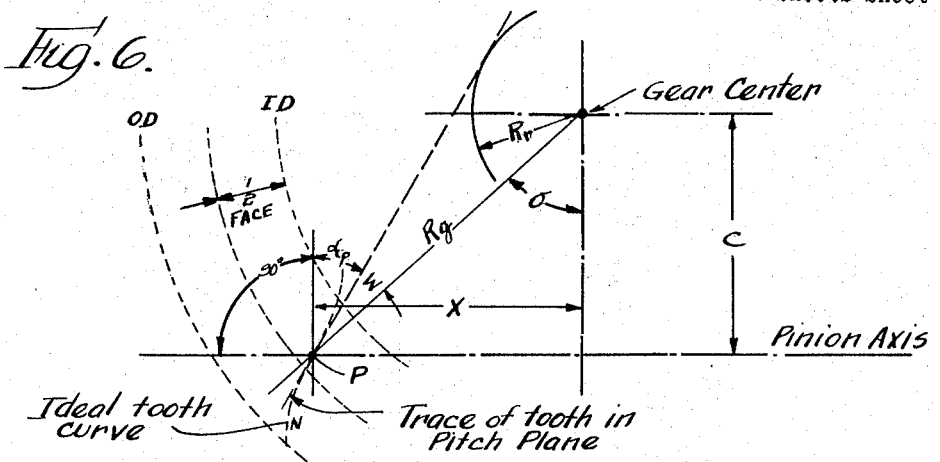
Fig. 6 is a somewhat schematic diagram illustrating the conditions for curvature reversal.

A somewhat different expression of the flat gear with nonradial teeth is taken in connection with Fig. 6. In this figure, the tooth is considered as being tangent to a circle $R_r$, and for illustrative purposes the tooth under consideration is shown as being in the lower left quadrant. The outside diameter and inside diameter of the gear teeth are indicated respectively by the dashed lines OD and ID. The pitch point is taken as being on the inner half of the gear tooth, but near the mean diameter. The tangent line comprising the extension of the gear tooth forms an angle $\alpha_p$ with a line through the pitch point parallel to the common perpendicular between the gear axis and the pinion axis. The tangent line representing the extension of the gear tooth also forms an angle $\Sigma$ with the gear radius extending to the pitch point. Other values are the same as previously or readily may be seen in Fig. 6.

For curvature reversal, $$\tan \sigma = \cot^3 \alpha_p \qquad (16)$$

$$\tan \alpha_p = \frac{C}{KR_p - x} \qquad (17)$$

The limit pressure angle is expressed as, $$\tan \phi_L = \frac{1}{K \cos \alpha_p} \qquad (18)$$

It can be shown that this is equivalent to the formulae previously given.

SUMMARY

In accordance with this invention, the ideal tooth curve, that curve which is codirectional with the relative velocity vector at every point of the pitch contact locus, is approximated on the gear of a right-angle skew-axis gearing by straight or plane teeth. The approximation is made by placing the pitch point so that the plane teeth are tangent to the ideal tooth curve as applied to the gear at inflection points thereof. The worm or pinion is made complementary to the gear, and the making of the gearing forms the subject matter of my copending application Serial Number 734,221, filed on May 9, 1958. The aforesaid copending application is hereby incorporated into this specification by reference. Briefly, the gear is broached, and the pinion is formed by a cutter or hob which is similar to the gear.

The examples of the invention as herein shown and described are for illustrative purposes. Various changes in structure will no doubt occur to those skilled in the art, and are to be understood as forming a part of the invention insofar as they fall within the spirit and scope of the appended claims.

The invention is claimed as follows:

1. A right-angle skew-axis gearing comprising a relatively large face-type gear and a mating pinion, said gear having a plurality of plane teeth each of which is tangent to the curve which is codirectional with the relative velocity vector at every point of the pitch-contact locus along which the pitch surfaces of the gear and pinion contact one another at a point of inflection of said curve, the gear teeth having unsymmetrical pressure angles, and the pinion is conjugate to the gear.

2. A right-angle skew-axis gearing as set forth in claim 1 wherein the gear is conical and the teeth are nonradial.

3. A right-angle skew-axis gearing as set forth in claim 1 wherein the gear is flat.

4. A right-angle skew-axis gearing as set forth in claim 1 wherein the teeth are radial.

5. A right-angle skew-axis gearing comprising a relatively large face-type gear and a mating pinion, said gear having a plurality of plane teeth each of which is tangent at the pitch point thereof to the curve which is codirectional with the relative velocity vector at every point of the pitch-contact locus along which the pitch surfaces of the gear and pinion contact one another at a point of inflection of said curve, the gear teeth having unsymmetrical pressure angles, and the pinion is conjugate to the gear, wherein the coordinates of the pitch point are related to the center distance and the speed ratio of the gearing in accordance with $$(Ky-x)^3 + [Cx+z(Ky-x)][z(1+K^2)-C] = 0$$

and wherein: $x$, $y$, and $z$ represent a rectangular-coordinate system with the pinion axis coincident with the $x$-axis and the gear axis coincident with a line parallel to the $y$-axis and passing through the $z$-axis; $C$ = center distance along the common perpendicular; and $K$ = speed ratio, number of gear teeth/number of pinion teeth.

6. A right-angle skew-axis gearing as set forth in claim 5 wherein the coordinates of the pitch point further are related in accordance with $$R_g^2 = x^2 + (C-z)^2$$

wherein: $R_g$ = gear radius at the pitch point.

7. A right-angle skew-axis gearing as set forth in claim 5 wherein the gear is flat and wherein the coordinates of the pitch point are related in accordance with:

$$(Ky-x)^3 - C^2x = 0$$

8. A right-angle skew-axis gearing as set forth in claim 5 wherein the gear teeth are radial and wherein the coordinates of the pitch point are related in accordance with:

$$cx^4 + [z(C-z)^2]x^2 - \frac{(C-z)^6}{C-z(1+K^2)} = 0$$

9. A right-angle skew-axis gearing as set forth in claim 5 wherein the gear is flat and the gear teeth are radial, wherein the pitch point is represented as follows:

$$z = 0; \quad x = C; \quad y = \frac{2x}{K}$$

10. A right-angle skew-axis gearing as set forth in claim 5 wherein the pressure angles of the gear teeth differ from the limit-pressure angle by at least ten degrees, wherein the limit-pressure angle is determined as follows:

$$\tan \phi_L = \frac{1}{C}(R_p \cot \sigma \cos \alpha_p - R_g \tan \phi \cos \alpha_g)$$

the limit-pressure angle being that pressure angle at which the rate of contact-line traverse on the gear tooth is zero, the pressure angle being the angle between the tooth-surface normal and the pitch plane, the tooth-surface normal being a line perpendicular to the tooth surface at the point of contact, and the pitch plane being the plane determined by rotation of the relative velocity vector as the speed ratio K is changed, wherein:

$\phi_L$ = limit pressure angle
$C$ = center distance on common perpendicular
$R_p$ = pinion radius at pitch point
$R_g$ = gear radius at pitch point
$\phi$ and $\sigma$ are cylindrical coordinate angles
$\alpha_p$ = spiral angle between relative velocity vector and perpendicular to pinion pitch-cone element through pitch point
$\alpha_g$ = spiral angle between relative velocity vector and perpendicular to gear pitch-cone element through pitch point 11. A right-angle skew-axis gearing as set forth in claim 10 wherein the gear is flat and the limit pressure angle is determined from the following:

$$\tan \phi_L = \frac{y}{x} \cos \alpha_p$$

wherein $x$ and $y$ are coordinates of a rectangular-coordinate system $x$, $y$, $z$, with the pinion axis coincident with the $x$-axis and the gear axis coincident with a line parallel to the $y$-axis and passing through the $z$-axis.

12. A right-angle skew-axis gearing as set forth in claim 10 wherein the gear teeth are radial, and the limit pressure angle is determined as follows:

$$\tan \phi_L = \frac{z \cos T}{C \sin T}$$

wherein $z$ is one of the coordinates of a rectangular-coordinate system $x$, $y$, $z$, with the pinion axis coincident with the $x$-axis and the gear coincident with a line parallel to the $y$-axis and passing through the $y$-axis, and wherein $T$ is the pitch-cone angle of the pinion-pitch cone.

13. A right-angle skew-axis gearing as set forth in claim 10 wherein the gear is flat and the teeth are radial and the limit-pressure angle is determined as follows:

$$\tan \phi_L = \frac{y \cos \sigma}{z}$$

wherein $y$ is a coordinate of a rectangular-coordinate system $x$, $y$, $z$, with the pinion axis coincident with the $x$-axis and the gear coincident with a line parallel to the $y$-axis and passing through the $z$-axis.

14. A right-angle skew-axis gearing comprising a relatively large face-type gear and a mating pinion, said gear having a plurality of plane teeth each of which is tangent at the pitch point thereof to the curve which is codirectional with the relative velocity vector at every point of the pitch-contact locus along which the pitch surfaces of the gear and pinion contact one another at a point of inflection of said curve, the gear teeth being nonradial of said gear and the axially outer ends thereof lying on a conical surface, and the pinion is conjugate to the gear, wherein the coordinates of the pitch point are related to the center distance and the speed ratio of the gearing in accordance with:

$$(Ky-x)^3 + [Cx + z(Ky-x)][z(1+K^2) - C] = 0$$

and wherein $x$, $y$, and $z$ represent a rectangular-coordinate system with the pinion axis coincident with the $x$-axis and the gear axis coincident with a line parallel to the $y$-axis and passing through the $z$-axis; $C$=center distance along the common perpendicular; and $K$=speed ratio, number of gear teeth/number of pinion teeth.

15. A right-angle skew-axis gearing comprising a relatively large face-type gear and a pinion mating therewith, said gear having a plurality of plane teeth each lying approximately along the relative-velocity vector curve of the gear, and the pressure angles of the face of each gear tooth differing from the limit pressure angle by substantial and approximately equal angular amounts, the limit pressure angle being that pressure angle at which the rate of contact-line traverse on the gear tooth is zero.

16. A right-angle skew-axis gearing as set forth in claim 15 wherein the limit pressure angle is inclined relative to the axis of the gear, and the face pressure angles are unsymmetrical.

17. A right-angle skew-axis gearing as set forth in claim 15 wherein the face pressure angles differ from the limit pressure angle by at least substantially 10°.

18. A right-angle skew-axis gearing as set forth in claim 17 wherein the face pressure angles differ from the limit pressure angle by at most substantially 20°.

References Cited in the file of this patent

UNITED STATES PATENTS 1,281,734　　　Wingqvist _____ Oct. 15, 1918